PHOTOGRAPHIC MATERIAL FOR THE SILVER DYESTUFF BLEACHING METHOD

Rudolf Mory, Dornach, and Walter Anderau, Aesch, Basel-Land, Switzerland, assignors to Ciba Limited, Basel, Switzerland, a company of Switzerland
No Drawing. Filed Feb. 14, 1963, Ser. No. 258,622
Claims priority, application Switzerland, Feb. 28, 1962, 2,454/62
7 Claims. (Cl. 96—99)

In photographic reproduction processes, yellow dyestuffs for gelatine layers are used not only as ground colors in the composition of the layers, but also as filter dyestuffs. The dyestuffs used in the silver dyestuff bleaching method must possess a wide range of properties. In general, but especially in the case of images viewed by reflected light, a good fastness to light is required, and the dyestuff should also be readily capable of being bleached in the silver dyestuff bleaching bath. It is advantageous if the solubility of the dyestuff in water is good, so as to facilitate the preparation of the layers, but, on the other hand, a high degree of diffusion resistance is required. If the yellow dyestuff is used as an image dyestuff in the composition of one of the layers, it should absorb light in the wavelength range of 400 to 480 m$\mu$, and should be highly transparent in the remaining spectrum range.

A yellow dyestuff can only be used as a filter dyestuff in the silver dyestuff bleaching method if the filter layer contains a sufficient amount of pre-exposed silver bromide to ensure that the yellow dyestuff is completely bleached out in the dyestuff bleaching bath. The absorption range for such filter dyestuffs can be 400 to 500 m$\mu$, or even up to 520 m$\mu$.

This invention is based on the observation that these requirements are especially well met by a group of yellow azodyestuffs exemplified by the dyestuff of the formula (1)
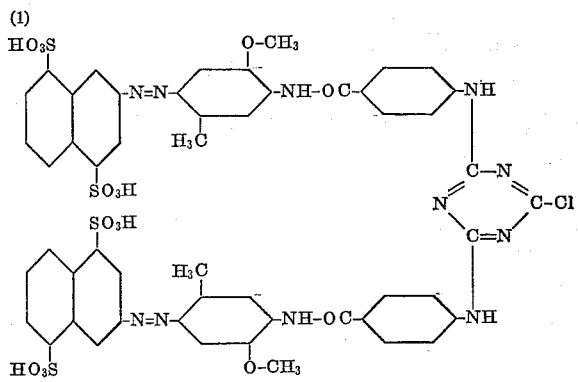

The present invention provides a photographic material for the silver dyestuff bleaching method that contains on a support a layer having at least one dyestuff of the formula (2)
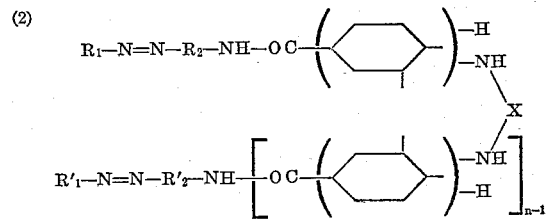

in which $R_1$ and $R'_1$ each represent a benzene or a naphthalene radical, $R_2$ and $R'_2$ each represent a benzene or naphthalene radical bound to the —N=N— group and —NH— group in a para-position, X represents a 1:3:5-triazine radical bound in the 2-position and 4-position to the —NH— groups, and $n$ represents a whole number 1 or 2, the dyestuff molecule containing at least 3 sulfonic acid groups.

A dyestuff of the Formula 2 may be prepared by condensing a 1:3:5-triazine that is substituted by halogen atoms in at least two of the positions 2, 4 and 6 with an aminoazo dyestuff of the formula (3)
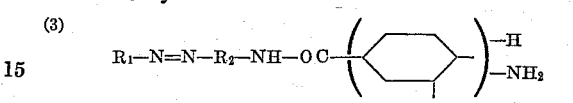

and with an aminoazo dyestuff of the formula (4)
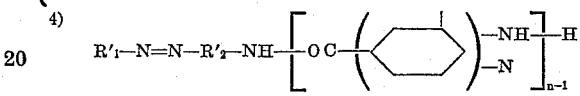

in which $R_1$, $R'_1$, $R_2$ and $R'_2$ and $n$ have the meanings given above. If the condensation product so obtained still contains a reactive halogen atom, it may be reacted with a further basic nitrogen compound or with a compound that is capable of replacing the said halogen atom with another substituent.

An aminoazo dyestuff of the Formula 3 or 4 is obtained when a diazo compound of an amine of the benzene or naphthalene series which advantageously contains one or more sulfonic acid groups is coupled with an aminobenzene capable of coupling in the para-position to the amino group or with a 1-aminonaphthalene (that is, an aminobenzene or 1-aminonaphthalene of the formula H—$R_2$—$NH_2$ or H—$R'_2$—$NH_2$), the resulting aminoazo dyestuff being acylated with a meta- or para-nitrobenzoyl chloride and the nitro group being reduced to an amino group. In the case of an aminoazo dyestuff of the Formula 4, the acylation and subsequent reduction is omitted when $n$ is 1.

The aminobenzene or aminonaphthalene suitable for the preparation of the diazo compound may contain further substituents, for example, alkyl groups such, for example, as methyl or ethyl groups, alkoxy groups as, for example, methoxy or ethoxy groups, halogen atoms as, for example, bromine or advantageously chlorine atoms, but more especially at least one acidic group imparting solubility in water, such, for example, as a carboxylic acid group or advantageously a sulfonic acid group. Thus, these amino compounds correspond, for example, to the formula (5)
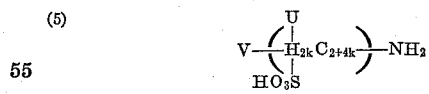

in which U and V may be identical or different and may each represent a hydrogen atom, a chlorine atom, an alkyl group, an alkoxy group or sulfonic acid group, and in which $k$ represents the whole number 1 or 2. Of these amino compounds of the benzene series ($k=1$) or the naphthalene series ($k=2$), the aminonaphthalene sulfonic acids of the formula (6) 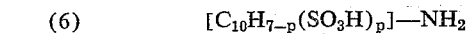

in which $p$ represents an integer not greater than 3, are especially valuable.

As examples of amino compounds suitable for the preparation of the diazo compound there may be mentioned:

1-aminobenzene-2-, -3- or -4-sulfonic acid,
1-aminobenzene-2:4- or -2:5-disulfonic acid,
1-amino-2-chlorbenzene-5-sulfonic acid,
1-amino-2-methylbenzene-4-sulfonic acid,
1-amino-4-methylbenzene-5-sulfonic acid,
1-amino-2-methoxybenzene-5-sulfonic acid,
1-aminonaphthalene-6- or -7-sulfonic acid,
1-aminonapthalene-3:6-disulfonic acid,
1-aminonaphthalene-3:6:8-trisulfonic acid,
2-aminonaphthalene-6:8-disulfonic acid and
2-aminonaphthalene-4:8-disulfonic acid.

In addition to the amino group, a compound of the formula H—$R_2$—$NH_2$ or H—$R'_2$—$NH_2$ used as the coupling component in the preparation of the aminoazo dyestuffs of the Formula 3 or 4 may also advantageously contain, if the compound belongs to the benzene series, one or two alkyl and/or alkoxy groups containing one or two carbon atoms. The compound may also contain other substituents which do not destroy its coupling power, for example, low molecular weight acylamino groups or alkyl-sulfonylamino groups. There may be mentioned, for example, coupling components of the formula (7) 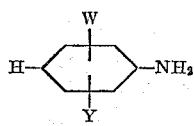

in which W and Y each represent a hydrogen atom or an alkyl group, for example, a methyl or ethyl group, or an alkoxy group, for example, a methoxy or ethoxy group, and in which Y may also represent an acetylamino group or a methylsulfonylamino group.

A coupling compound of the naphthalene series advantageously contains the amino group in the 1-position, and advantageously also contains a sulfonic acid group in the benzene nucleus that does not participate in the coupling process. An amino compound of the naphthalene series may contain an alkoxy group, for example, a methoxy group, in the 2-position.

As examples of compounds of the formula

H—$R_2$—$NH_2$ or H—$R'_2$—$NH_2$ suitable for use as the coupling component in the preparation of an aminoazo dyestuff of the Formula 3 or 4, there may be mentioned the following:

1-amino-2- or -3-methylbenzene,
1-amino-2- or -3-methoxybenzene,
1-amino-2- or -3-ethoxybenzene,
1-amino-2:5-dimethylbenzene,
1-amino-2:5-dimethoxybenzene,
1-amino-2:5-diethoxybenzene,
1-amino-2-methoxy-5-methylbenzene,
1-amino-3-acetylaminobenzene,
1-amino-3-methylsulfonylaminobenzene,
1-aminonaphthalene,
1-aminonaphthalene-6- or -7-sulfonic acid and
1-amino-2-methoxynaphthalene-7-sulfonic acid.

For the acylation of the aminoazo dyestuffs of the formula (8) 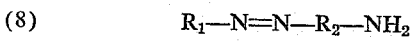

or, if desired, of the formula (9) 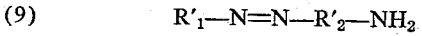

there is used a nitrobenzoyl chloride of the formula

(10) 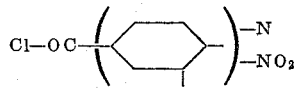

that is to say, 3-nitrobenzoyl chloride or advantageously 4-nitrobenzoyl chloride.

After reduction of the nitro groups to amino groups, the aminoazo dyestuffs of the Formulae 3 and 4 are condensed stepwise in any desired sequence with a 1:3:5-triazine that is substituted by halogen atoms in at least two of the positions 2, 4 and 6. Advantageously, this condensation process is carried out with cyanuric chloride. The cyanuric chloride may be condensed with a single aminoazo dyestuff in a molar ration of 1:2. In this manner there are obtained symmetrical dyestuffs of the Formula 2, in which $R_1$ is identical with $R'_1$, $R_2$ is identical with $R'_2$ and $n$ is 2. Asymmetrical dyestuffs are obtained when cyanuric chloride is condensed with two different aminoazo dyestuffs of the Formulae 3 and 4. There may be chosen, for example, a dyestuff of the Formula 3 and a dyestuff of the Formula 4 without an aminobenzoyl radical, that is, when $n$ is 1, or two aminoazo dyestuffs that are differently substituted.

The condensation products obtained in this manner from 1 mol of cyanuric chloride and 2 mols of aminoazo dyestuff also contain a reactive chlorine atom attached to the triazine ring. If desired, the said atom may be exchanged for another substituent, for example, a hydroxyl group or a methoxy group or for an amino group that may be further substituted. In the last-mentioned case, the dyestuff may be reacted, for example with ammonia, a monoalkylamine such, for example, as ethylamine or methylamine, a dialkylamine such, for example, as dimethylamine or diethylamine, a hydroxyalkylamine such, for example, as mono- or diethanolamine or an aromatic amine, especially one of the benzene series. For example, the following radicals may be substituted for the remaining chlorine atoms of the cyanuric chloride:

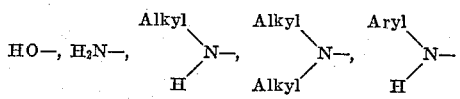

The aryl radicals may contain further substituents, for example, sulfonic acid groups. They must, however, contain one or more sulfonic acid groups when the remainder of the dyestuff molecule contains fewer than three sulfonic acid groups. In this case the chlorine atom attached to the triazine ring is advantageously replaced by the radical of an aminoalkyl sulfonic acid or of an aminobenzene- or aminonaphthalene-mono- or disulfonic acid.

The dyestuffs of the Formula 2 and the starting materials required for these dyestuffs may be made by methods in themselves known. The diazo compound of an amine of the formula $R_1$—$NH_2$ or $R'_1$—$NH_2$ is reacted in an acid medium with a coupling component of the formula H—$R_2$—$NH_2$ or H—$R'_2$—$NH_2$; an amine that is difficult to couple is advantageously in the form of the ω-methane sulfonic acid, the methane sulfonic acid group subsequently being split off.

As already mentioned, the condensation of the cyanuric chloride with the two aminoazo dyestuffs is carried out stepwise, in which process it is advantageous to carry out the first step in an acid medium and the second step in a slightly acidic to neutral medium. If the same aminoazo dyestuff is used in both steps and a symmetrical disazo dyestuff is to be prepared, the total amount (2 mols) of aminoazo dyestuff may be mixed with a cyanuric chloride (1 mol) at the beginning of the operation and the stepwise reaction can be accomplished under suitable reaction conditions.

If the condensation product so obtained is further reacted with a base containing nitrogen, this operation is advantageously carried out in an alkaline medium, for example, in the presence of an excess amount of the base.

The dyestuffs of the Formula 2 are precipitated from the reaction mixture, advantageously at pH values of 7 to 8, in the form of their alkali metal salts, advantageously their sodium salts. For further purification, they may be precipitated once or several times from an aqueous solution with sodium acetate and/or ethanol and then filtered, after which they are thoroughly washed with ethanol. Depending on the choice of components, there are obtained dyestuffs that give greenish yellow to orange tints.

The photographic layer that, according to the present invention, is colored with at least one azo-dyestuff of the Formula 2, may also be prepared in known manner and used for the production of colored photographic images. In this connection, it is pointed out that those dyestuffs that still contain a halogen atom bound to the triazine ring may be caused to react with gelatine present in the layer in such a manner that a homopolar bond is formed between the dyestuff and the gelatine.

In particular, the dyestuffs of the Formula 2 may be present in a multi-layer photographic material, which, on a layer support, comprises a layer containing a selectively red-sensitized silver bromide emulsion colored with a green-blue dyestuff and above that, a layer containing a selectively green-sensitized silver bromide emulsion colored with a magenta dyestuff and, finally, above that, a selectively blue-sensitized layer colored with a dyestuff of the Formula 2.

A special advantage of the dyestuffs of the Formula 2 is that they are highly resistant to acidic oxidation baths, for example, a bath that contains 5 grams of potassium bichromate and 5 cc. of concentrated sulfuric acid per liter of water, which is necessary when, in the course of the developing process a silver dissolving bath is required for the layers (reversal process).

The following examples illustrate the invention, the parts and percentages being by weight unless otherwise stated.

*Example 1*

20 milligrams of the dyestuff of the Formula 1 are dissolved in 3.4 cubic centimeters of water. This solution is mixed with 3.3 cubic centimeters of a gelatine solution of 6% strength and 3.3 cubic centimeters of a silver bromide emulsion (with a gelatine content of 6.5% and 16 grams of silver per kilogram of emulsion), and the mixture is poured on to a plate measuring 13 centimeters x 18 centimeters. Exposure is carried out behind a stepped photometric absorption wedge and the silver image is developed in a Metol-hydroquinone developer and fixed. The image dyestuff is then bleached out, according to the amount of silver present, in a solution which had a composition within the following range of compositions:

Per 1000 parts by volume, 30 to 100 parts by volume of hydrochloric acid of 37% strength, 40 to 120 parts of potassium bromide, 30 to 50 parts of thiourea and 0.001 to 0.01 part of aminohydroxyphenazine. Excess silver is removed in a bath that contains, per 1000 parts by volume, 100 parts of sodium chloride, 100 parts of crystalline copper sulfate and 50 parts by volume of hydrochloric acid of 37% strength. Finally, fixation is carried out in the usual manner. There is obtained a yellow color wedge that constitutes the opposite image of the silver image originally used and which has been bleached pure white at areas where the silver was originally most dense. Such a yellow image can also constitute a part of a multicolor material.

The dyestuff of the Formula 1 may be prepared as follows: By coupling diazotized 2-aminonaphthalene-4:8-disulfonic acid with 1-amino-2-methoxy-5-methylbenzene in an acetic acid medium, acylating the resulting aminoazo dyestuff with para-nitrobenzoyl chloride, likewise in an acetic acid medium, and reducing the nitro compound with sodium sulfide, there is obtained the dyestuff of the formula (11)

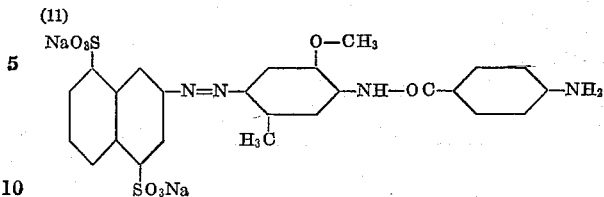

36.85 parts of monoazo dyestuff so obtained are dissolved in 500 parts of water (neutral solution). The solution is cooled to 0° C., and to it is added a solution of 5.54 parts of cyanuric chloride in 30 to 40 parts by volume of acetone, the cyanuric chloride being precipitated. The primary condensation begins immediately and is continued at 0 to 5° C. until complete while gradually adding, dropwise, 30 parts by volume of 1 N NaOH. This gradual addition of NaOH is so regulated that the pH value of the solution is maintained below 6. 15 minutes after the primary condensation is complete, the temperature of the reaction mixture is raised to 48 to 50° C. The second condensation process is carried out at that temperature for 48 to 60 hours, in which process the pH value is maintained between 5.0 and 6.5 by the dropwise addition of 30 parts by volume of 1 N NaOH. After cooling the reaction mixture, the dyestuff is converted into a form that can be filtered by the addition of a sodium acetate solution and alcohol, isolated by suction filtration and then washed with alcohol. The dyestuff is purified by precipitating it once or twice from an aqueous solution by means of sodium acetate and alcohol, after which it is filtered off, washed with alcohol and then dried in vacuo at 50 to 60° C. When dry, the dyestuff constitutes an orange to yellow-brown powder.

*Example 2*

The same procedure is adopted as in Example 1, except that one of the dyestuffs, the preparation of which is described below, is used instead of the dyestuff of the Formula 1.

20 parts by volume of γ-methoxypropylamine are added to 6.7 parts of the dyestuff of the Formula 1 in 180 parts of water. The mixture is heated for two hours at 80 to 90° C. After cooling the reaction mixture, the dyestuff is precipitated by the addition of 25 parts by volume of 4 N sodium acetate solution and 100 parts by volume of ethyl alcohol; is then isolated by suction filtration and well washed with ethyl alcohol. After drying in vacuo at 50 to 60° C., there are obtained about 5.3 parts of a dyestuff that corresponds to the Formula 1, but that has attached to its triazine ring the group of the formula —NH—$CH_2$—$CH_2$—$CH_2$—O—$CH_3$ instead of the chlorine atom.

Dyestuffs of very similar properties are obtained when the dyestuff of the Formula 1 is reacted with the following compounds instead of γ-methoxypropylamine:

Sodium hydroxide (the chlorine atom is replaced by the HO group),
Ethanolamine,
1-aminobenzene-3-sulfonic acid,
Diethylamine,
Monomethylamine,
4-aminobenzoic acid,
Aminoethane sulfonic acid,
Ammonia.

*Example 3*

The procedure described in Example 1 is adopted, using the dyestuffs (the formulae of which are given below, and there are likewise obtained color wedges that are the opposites of the silver images originally formed, and that are bleached to pure white at the areas where the silver was originally most dense. The dyestuffs may be prepared by the methods described in Examples 1 and 2.

(2a) 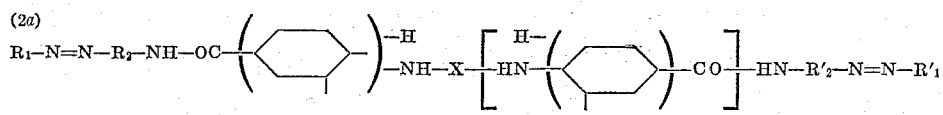
(12) 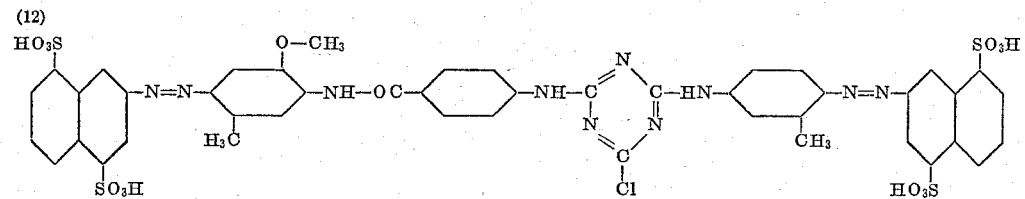
(13) 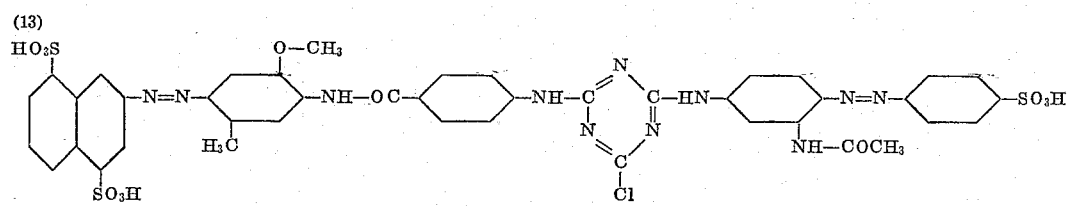
(14) 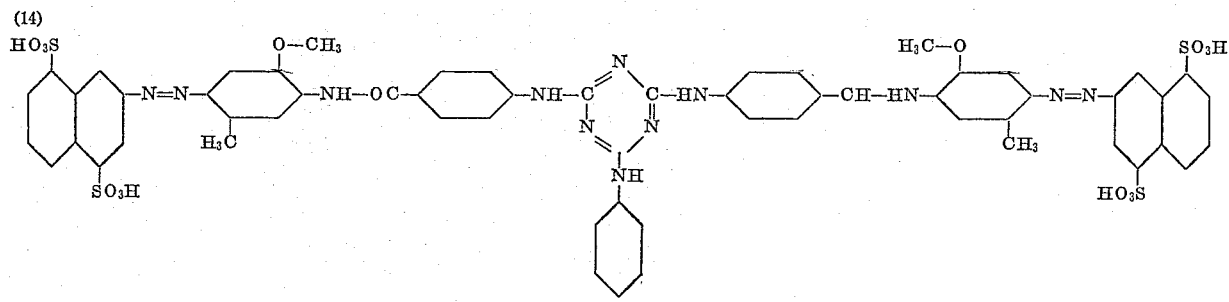
(15) 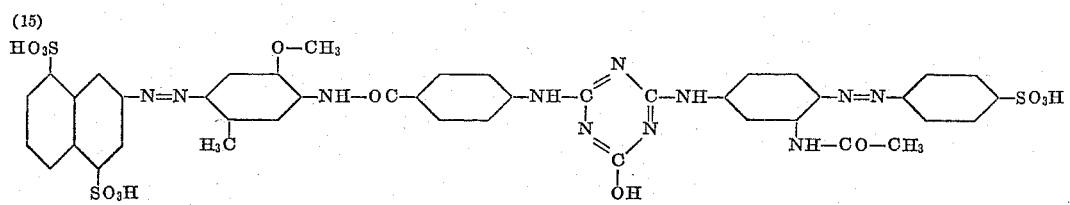
(16) 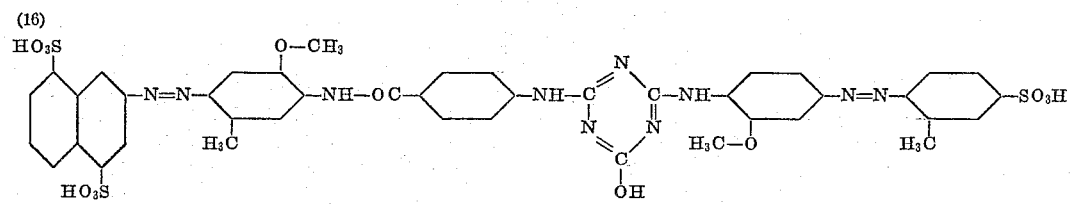
(17) 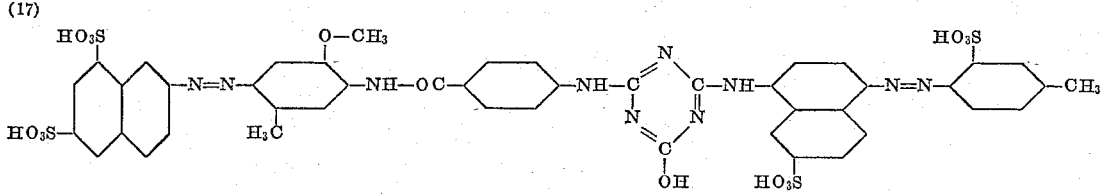
(18) 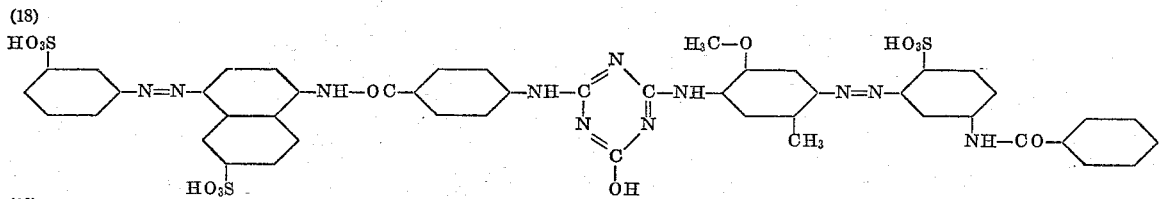
(19) 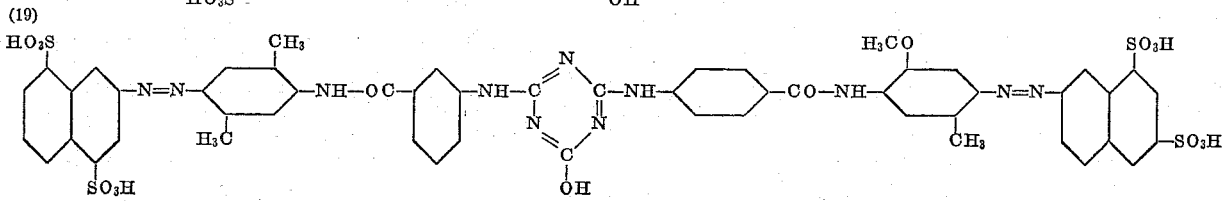

(20) 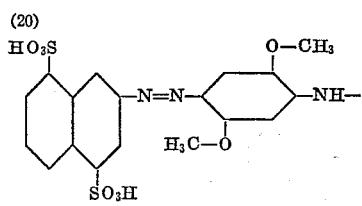 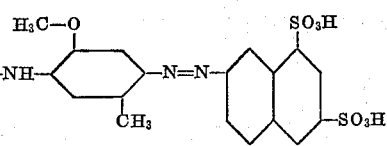

What is claimed is:

1. Photographic material for the silver dyestuff bleaching process that contains on a support a silver halide emulsion layer having at least one dyestuff of the formula:

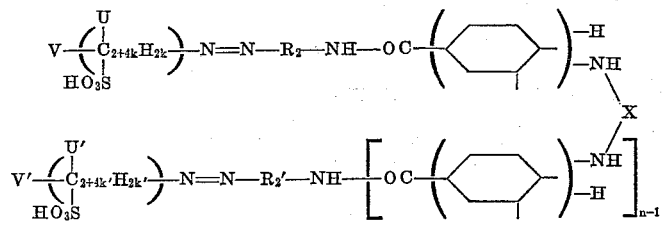

in which U, U', V and V' each represents a member selected from the group consisting of a hydrogen atom, a chlorine atom, a lower alkyl group, a lower alkoxy group and a sulfonic acid group, $R_2$ and $R_2'$ each represents a member selected from the group consisting of a benzene radical and a naphthalene radical, $R_2$ and $R_2'$ each being bound to the —N=N— group and the —NH— group in paraposition, X represents a 1:3:5-triazine radical bound in 2- and 4-position to the —NH— groups and $k$ and $n$ each represents a whole number of at the most 2, the dyestuff molecule containing at least 3 sulfonic acid groups.

2. Photographic material for the silver dyestuff bleaching process that contains on a support a silver halide emulsion layer having at least one dyestuff of the formula

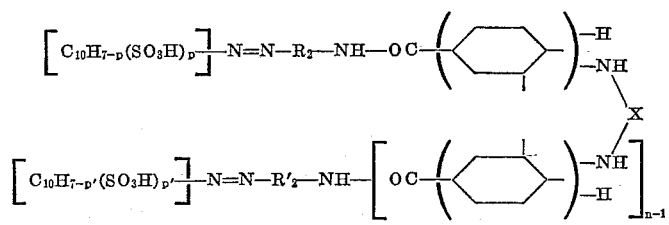

in which $R_2$ and $R'_2$ each represents a benzene radical bound to the —N=N— group and —NH— group in para-position, X represents a 1:3:5-triazine radical bound in 2- and 4-position to the —NH— groups and $n$ represents a whole number of at the most 2 and $p$ and $p'$ each represents a whole number of at the most 3, the dyestuff molecule containing at least 3 sulfonic acid groups.

3. Photographic material for the silver dyestuff bleaching process that contains on a support a silver halide emulsion layer having at least one dyestuff of the formula

R₁—N=N—R₂—NH—OC—⌬—NH
R'₁—N=N—R'₂—NH—[OC—⌬—NH]ₙ₋₁
            X in which $R_1$ and $R'_1$ each represents an aromatic radical having at most 12 ring carbon atoms, $R_2$ and $R'_2$ each represents a benzene radical bound to the —N=N— group and —NH— group in para-position, X represents a 1:3:5-triazine radical bound in 2- and 4-position to the —NH— groups, and $n$ represents a whole number of at the most 2, the dyestuff molecule containing at least 3 sulfonic acid groups.

4. Photographic material for the silver dyestuff bleaching process that contains on a support a silver halide emulsion layer having at least one dyestuff of the formula

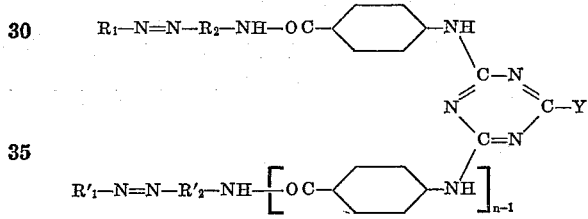

in which $R_1$ and $R'_1$ each represents an aromatic radical having at most 12 ring carbon atoms, $R_2$ and $R'_2$ each represents a benzene radical bound to the —N=N— group and the —NH— group in para-position, Y represents a member selected from the group consisting of a chlorine atom and a hydroxyl group, and $n$ represents a whole number of at the most 2, the dyestuff molecule containing at least 3 sulfonic acid groups.

5. Photographic material for the silver dyestuff bleaching process that contains on a support a silver halide emulsion layer having the dyestuff of the formula

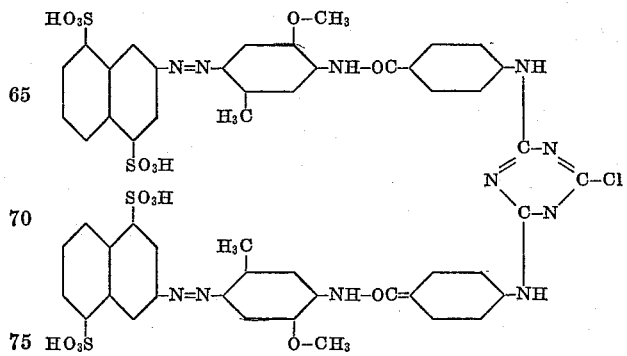

6. Photographic material for the silver dyestuff bleaching process that contains on a support a silver halide emulsion layer having the dyestuff of the formula

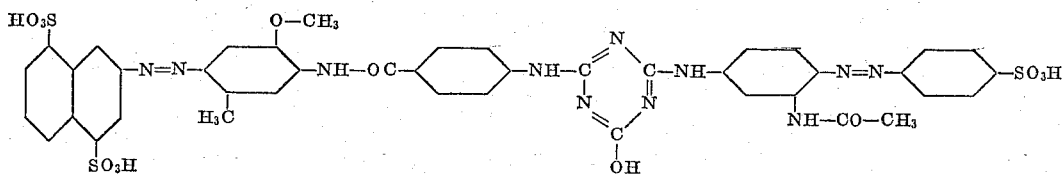

7. Photographic material for the silver dyestuff bleaching process that contains on a support a silver halide emulsion layer having the dyestuff of the formula

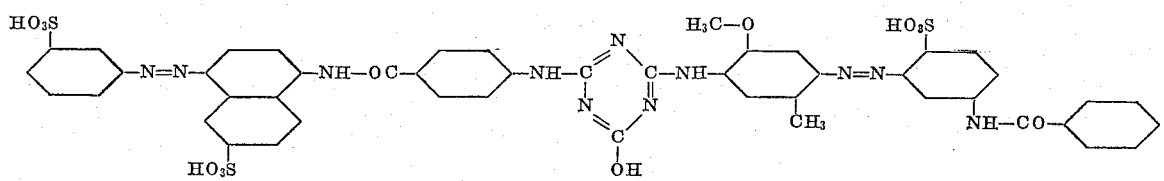

References Cited by the Examiner
UNITED STATES PATENTS

| | | | |
|---|---|---|---|
| 2,612,496 | 9/52 | Gaspar et al. | 96—99 |
| 2,835,663 | 5/58 | Benz | 260—153 |
| 2,844,574 | 7/58 | Gaspar et al. | 96—99 |

NORMAN G. TORCHIN, *Primary Examiner.*